United States Patent
Ninomiya et al.

(10) Patent No.: US 9,598,312 B2
(45) Date of Patent: Mar. 21, 2017

(54) METHOD FOR CONTROLLING FREE LIME CONTENT OF CLINKER

(71) Applicant: MITSUBISHI MATERIALS CORPORATION, Tokyo (JP)

(72) Inventors: Yuuki Ninomiya, Chichibu-gun (JP); Hisanobu Tanaka, Chichibu-gun (JP); Makio Yamashita, Chichibu-gun (JP); Yoichiro Nakanishi, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 14/388,513

(22) PCT Filed: Mar. 8, 2013

(86) PCT No.: PCT/JP2013/056452
§ 371 (c)(1),
(2) Date: Sep. 26, 2014

(87) PCT Pub. No.: WO2013/146186
PCT Pub. Date: Oct. 3, 2013

(65) Prior Publication Data
US 2015/0321956 A1  Nov. 12, 2015

(30) Foreign Application Priority Data
Mar. 29, 2012 (JP) ................. 2012-077525

(51) Int. Cl.
*C04B 7/44* (2006.01)
*C04B 7/36* (2006.01)
*C04B 7/42* (2006.01)

(52) U.S. Cl.
CPC .............. *C04B 7/424* (2013.01); *C04B 7/361* (2013.01); *C04B 7/421* (2013.01); *C04B 7/4407* (2013.01)

(58) Field of Classification Search
None
See application file for complete search history.

(56) References Cited

U.S. PATENT DOCUMENTS 4,716,532 A    12/1987  Benoit et al.
5,584,926 A *  12/1996  Borgholm ................. C04B 7/00
                                                    106/713
(Continued)

FOREIGN PATENT DOCUMENTS

CN    1098076 A    2/1995
CN    1745047 A    3/2006
(Continued)

OTHER PUBLICATIONS

H.F.W. Taylor "Cement Chemistry 2nd edition", 1997, pp. 72-74 and a cover page.
(Continued)

*Primary Examiner* — Kaj K Olsen
*Assistant Examiner* — Karam Hijji
(74) *Attorney, Agent, or Firm* — Locke Lord LLP; James E. Armstrong, IV; Julie Tabarovsky

(57) ABSTRACT

Provided is a method for controlling a free lime content of a clinker by regulating the free lime content. Here the amount of sulfur trioxide resulting from fuel and the used amount of a fluorine-based mineralizer are regulated using the following Formulas (1) to (3), thereby controlling the free lime content (f.CaO) of the clinker.

$$f.CaO = 0.29 \times e^{(0.65 \times A)}(A = a \times SO_3 + b) \quad (1)$$

$$a = 0.0001 \times F + 9.2 \times t - 0.18 \times HM - 9.2 \quad (2)$$

$$b = -0.0005 \times F - 32.8 \times t - 2.9 \times HM + 28.4 \quad (3)$$

$SO_3$ is an amount of sulfur trioxide in the clinker; a is a coefficient satisfying Formula (2); b is a coefficient satisfy-
(Continued)

ing Formula (3); F is an amount of fluorine in the clinker; when a burning temperature is X° C., t=X/1450; and HM is a hydraulic modulus.

2 Claims, 4 Drawing Sheets

(56) References Cited

U.S. PATENT DOCUMENTS

| | | | |
|---|---|---|---|
| 6,599,123 B2 * | 7/2003 | Ramirez-Tobias | C04B 7/00 106/757 |
| 2007/0193477 A1 | 8/2007 | Sawaki et al. | |
| 2007/0266903 A1 | 11/2007 | Gartner et al. | |

FOREIGN PATENT DOCUMENTS

| | | |
|---|---|---|
| CN | 1926074 A | 3/2007 |
| CN | 102690067 A | 9/2012 |
| CN | 102803176 A | 11/2012 |
| JP | 61-209937 | 9/1986 |
| JP | 03-197338 A | 8/1991 |
| JP | 10-197518 A | 7/1998 |
| JP | 2001-130932 A | 5/2001 |
| JP | 2006-282455 | 10/2006 |
| JP | 2008-285370 A | 11/2008 |
| JP | 2011-063451 A | 3/2011 |
| JP | WO 2011111811 A1 * | 9/2011 ............... C04B 7/00 |
| JP | 2011-207752 A | 10/2011 |
| WO | 2010/146281 | 12/2010 |

OTHER PUBLICATIONS

A. Harrisson, "Clinkering made easy?", International Cement Review, Dec. 2008, pp. 42-44 and information sheets.
Notification (Information Statement) Mailed Dec. 17, 2014, issued for the Japanese patent application No. 2012-077525 and English translation thereof.
Office Action mailed Jan. 6, 2015, issued for the Australian patent application No. 2013238358.
International Search Report mailed May 7, 2013, issued for PCT/JP2013/056452 and English translation thereof.
Office Action mailed Oct. 14, 2015, issued for the Japanese patent application No. 2012-077525.
Office Action mailed Aug. 4, 2015, issued for the Chinese patent application No. 201380016612.3 and an English translation of the search report.
Office Action, dated Mar. 17, 2016, issued for Taiwanese patent application No. 102109867.

* cited by examiner

METHOD FOR CONTROLLING FREE LIME CONTENT OF CLINKER

TECHNICAL FIELD

The present invention relates to a method for controlling a free lime content of a clinker in a production method of cement so as to suppress cement quality fluctuation caused by the fluctuation of the free lime content.

Priority is claimed on Japanese Patent Application No. 2012-077525, filed Mar. 29, 2012, the content of which is incorporated herein by reference.

BACKGROUND ART

In cement plants, a mixed and ground substance consisting of limestone, clay, silica stone, iron ore, and the like is burned at a high temperature in an SP kiln or in an NSP kiln, thereby producing a hydraulic clinker. The free lime content of the clinker exerts an influence on physical properties of cement, and accordingly, the factories produce the clinker while controlling the free lime content to fall within a certain range.

Conventionally, as the method for controlling the free lime content, a method of varying the mixing ratio of respective raw materials (adjusting chemical components of a mixture of raw materials), the amount of raw materials put into the kiln, the rotation speed of the kiln, the length of flames of a burner, the amount of kiln exhaust gas to be aspirated, and the like or a method of using a mineralizer is used.

For example, in the production method disclosed in PTL 1, the free lime content of the clinker and the like is controlled to be equal to or smaller than 0.5% by mass. Moreover, in the method disclosed in PTL 2, the free lime content and the fluorine content of cement are controlled such that they satisfy a certain relational expression. Furthermore, PTL 3 discloses a production method which makes it possible to decrease the cement clinker burning temperature without increasing the amount of fluorine by causing the burned clinker to contain one or more elements selected from a group consisting of fluorine, sulfur, chlorine, and bromine as well as one or more metal elements selected from a group consisting of group 3 to group 12 elements.

However, there is a limit to control the free lime content by the above methods, and in the current situation, a great fluctuation of the free lime content is unavoidable. When the free lime content fluctuates, the basic physical properties of cement (concrete), such as setting properties, strength, and fluidity, are influenced.

CITATION LIST

Patent Literature

[PTL 1] Japanese Unexamined Patent Application, First Publication No. 2008-285370
[PTL 2] Japanese Unexamined Patent Application, First Publication No. 2001-130932
[PTL 3] Japanese Unexamined Patent Application, First Publication No. 2011-207752

SUMMARY OF INVENTION

Technical Problem

The present invention provides a method for suppressing cement quality fluctuation caused by the fluctuation of the free lime content by controlling the free lime content of the clinker to fall within a certain range in a cement production process.

Solution to Problem

According to the present invention, there is provided a method for controlling a free lime content that is constituted as below.

[1] A method for controlling a free lime content of a cement clinker, includes regulating the free lime content (f.CaO) in the cement clinker using Formulas (1) to (3).

$$f.CaO = 0.29 \times e^{(0.65 \times A)} (A = a \times SO_3 + b) \quad (1)$$

$$a = 0.0001 \times F + 9.2 \times t - 0.18 HM - 9.2 \quad (2)$$

$$b = -0.0005 \times F - 32.8 \times t + 2.9 \times HM + 28.4 \quad (3)$$

wherein in Formula (1), f.CaO is a free lime content (wt %),
$SO_3$ is an amount (wt %) of sulfur trioxide in the cement clinker,
a is a coefficient satisfying Formula (2),
b is a coefficient satisfying Formula (3),
F is an amount (mg/kg) of fluorine in the cement clinker,
t is a coefficient determined based on a temperature of 1450° C. (when a burning temperature is X° C., t=X/1450), and
HM is a hydraulic modulus.

[2] The method for controlling a free lime content of a cement clinker according to [1], the method may further include adjusting an additive amount of fluorite or fluorine-containing waste that is a fluorine source in the cement clinker and used as a mineralizer, and an used amount of fuel or an additive amount of waste gypsum as an $SO_3$ source in the cement clinker to control the free lime content (f.CaO) using the Formulas (1) to (3).

According to the control method of the present invention, it is possible to control the free lime content (f.CaO) of the clinker, by adjusting the used amount of fuel or the additive amount of waste gypsum as an $SO_3$ source in the clinker, and by adjusting the additive amount of fluorite or fluorine-containing waste that is a fluorine source in the clinker and used as a mineralizer using the Formula (1).

DESCRIPTION OF EMBODIMENTS

Figure 1:
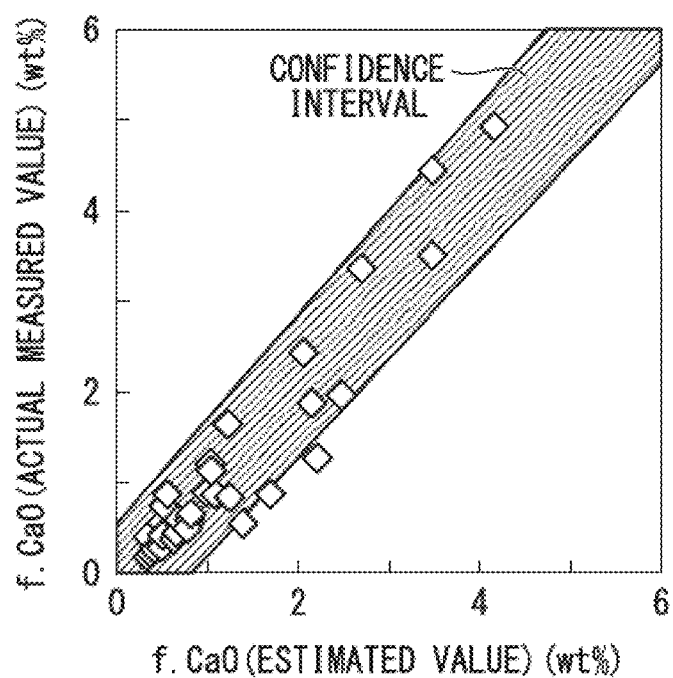
FIG. 1 is a graph showing the correspondence between a calculated value of a free lime content and an actual measured value of the free lime content.

Hereinafter, the control method of the present invention will be described in detail based on embodiments.

The control method of the present invention is a method for controlling a free lime content of a cement clinker, in which the free lime content (f.CaO) of the clinker is regulated using Formulas (1) to (3).

$$f.CaO = 0.29 \times e^{(0.65 \times A)}(A = a \times SO_3 + b) \quad (1)$$

$$a = 0.0001 \times F + 9.2 \times t - 0.18 \times HM - 9.2 \quad (2)$$

$$b = -0.0005 \times F - 32.8 \times t - 2.9 \times HM + 28.4 \quad (3)$$

In Formula (1), f.CaO is a free lime content (wt %); $SO_3$ is the amount (wt %) of sulfur trioxide in the clinker; a is a coefficient satisfying Formula (2); b is a coefficient satisfying Formula (3); F is the amount (mg/kg) of fluorine in the clinker; t is a coefficient determined based on a temperature f 1450° C. (when a burning temperature is X° C., t=X/1450); and HM is a hydraulic modulus.

Most of $SO_3$, which represents an amount of sulfur trioxide in the clinker, results from fuel for burning. Moreover, the $SO_3$ amount in the clinker is adjusted by intermixing waste gypsum board powder with fuel or by putting the waste gypsum board powder into a kiln from the kiln outlet part. The used amount of fuel or the amount of waste gypsum put into the kiln is adjusted, it is possible to control the $SO_3$ amount represented using Formula (1).

Moreover, a mineralizer is added to the raw materials of the clinker. Fluorite, fluorine-containing waste (sludge), and the like are used as the mineralizer. Fluorine contained in the clinker mainly results from the mineralizer. Accordingly, for example, by adjusting the additive amount of mineralizer, it is possible to regulate the coefficients a and b of Formulas (2) and (3) including the fluorine amount F and to finally control the $SO_3$ amount in the clinker represented by Formula (1).

The hydraulic modulus HM is an index represented by $HM = CaO/(SiO_2 + Al_2O_3 + Fe_2O_3)$. The greater the HM is, the amount of calcium oxide or alite in the clinker increases. As a result, burning reactivity decreases, hence the amount of free lime content increases. Generally, the hydraulic modulus HM of the raw material of the clinker is 1.90 to 2.30.

Furthermore, Formula (1) is satisfied when the fluorine amount F in the clinker is equal to or greater than 300 mg/kg. If the fluorine amount F in the clinker is smaller than this, the correlation between fluorine and $SO_3$ tends to be weakened, and the free lime content (f.CaO) of the clinker tends to increase greater than the value represented by Formula (1).

EXAMPLES

Examples of the present invention will be described below.

The $SO_3$ amount in the clinker was measured according to JIS R 5202:2010 "Methods for chemical analysis of cement". The fluorine amount in the clinker was measured by X-ray fluorescence analysis (powder briquette method or bead method).

The free lime content (f.CaO) of the clinker was measured according to JCAS I-01:1997 "Quantification of free calcium oxide".

The burning temperature coefficient t is a coefficient determined based on a temperature of 1450° C. When the burning temperature is 1350° C., t=1350/1450=0.93, and when the burning temperature is 1450° C., t=1450/1450=1.00.

Example 1

The $SO_3$ amount, fluorine amount, and free lime content (f.CaO) of the produced dement clinker were measured. The results are shown in Table 1 together with the hydraulic modulus HM and the burning temperature coefficient t. Moreover, the free lime content (estimated f.CaO), which is calculated by plugging the hydraulic modulus of the raw material, the burning temperature coefficient, the measured $SO_3$ amount, and the fluorine amount into Formula (1), is also shown in Table 1. In addition, the relationship between the free lime content (estimated f.CaO) based on Formula (1) and the actual measured free lime content (f.CaO) is shown in FIG. 1.

As shown in Table 1, a difference between the free lime content (f.CaO) based on Formula (1) and the actual measured free lime content (f.CaO) is small and within a narrow range as shown in FIG. 1. This shows that Formula (1) showing the free lime content (f.CaO) of the clinker is highly reliable, and accordingly, it is possible to reliably control the free lime content (f.CaO) of the clinker based on Formula (1).

Example 2

Figure 2:
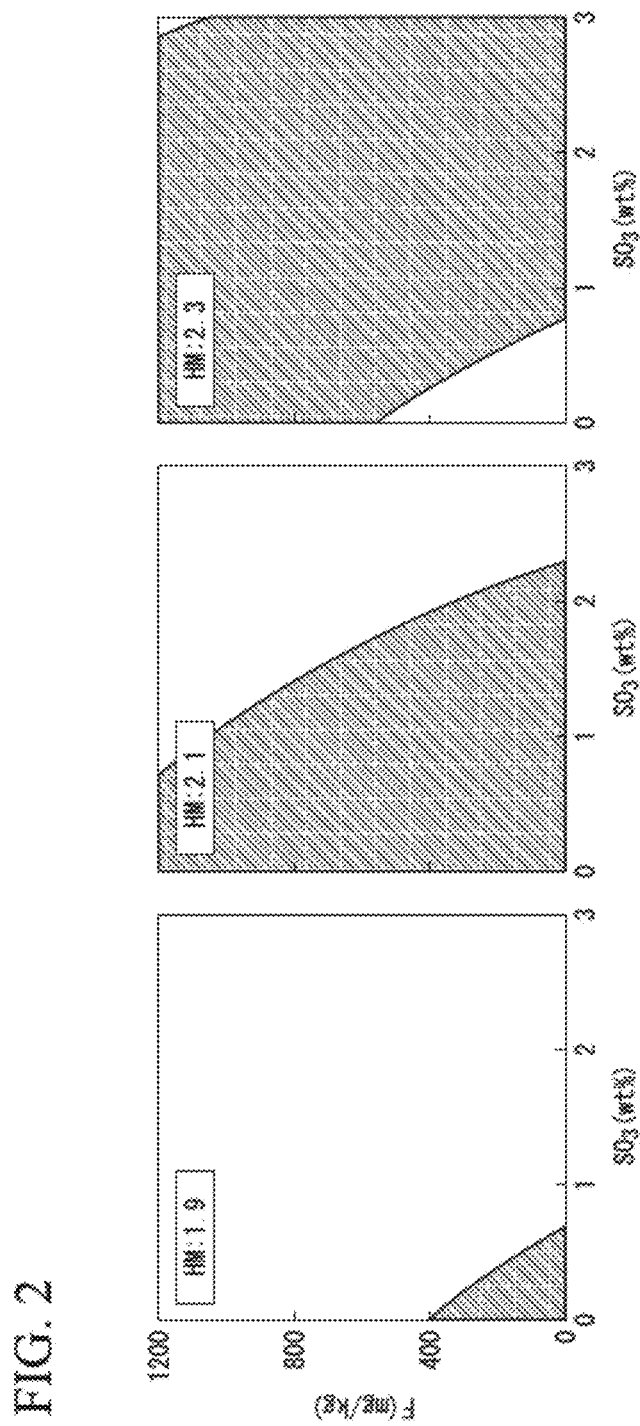
FIG. 2 is a graph showing the relationship between the $SO_3$ amount and the fluorine amount at a burning temperature of 1450° C.
Figure 3:
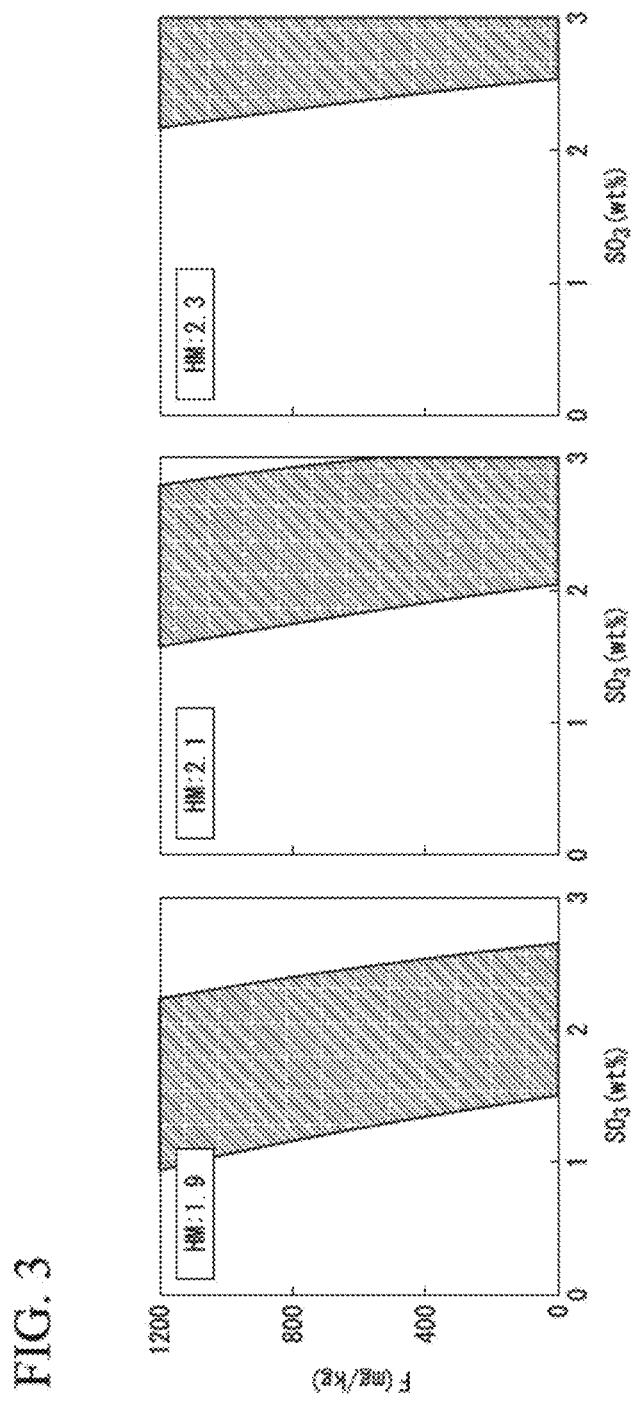
FIG. 3 is a graph showing the relationship between the $SO_3$ amount and the fluorine amount at a burning temperature of 1350° C.
Figure 4:
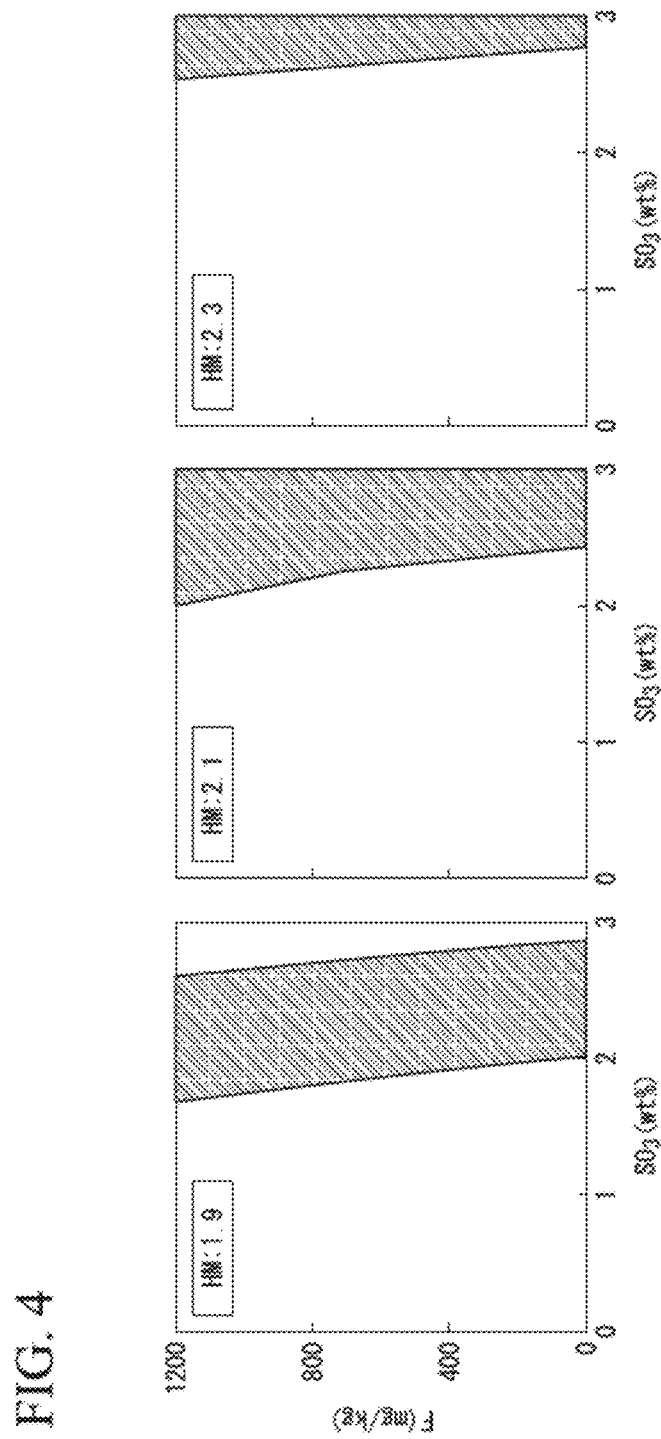
FIG. 4 is a graph showing the relationship between the $SO_3$ amount and the fluorine amount at a burning temperature of 1300° C.

FIG. 2 and FIG. 3 show the relationship between the $SO_3$ amount and the fluorine amount that make the free lime content (f.CaO) at each burning temperature fall within a range of 0.5<f.CaO<1.0 based on Formula (1) when each of the raw materials of the clinker having the hydraulic modulus HM of 1.9, 2.1, and 2.3 is burned at 1300° C., 1350° C., and 1450° C. respectively. In the drawings, the shaded area is in a range of 0.5<f.CaO<1.0. By adjusting the $SO_3$ amount and the fluorine amount, it is possible to control the free lime content to fall within a range of 0.5<f.CaO<1.0.

TABLE 1

|  | $SO_3$ | F | t | HM | f.CaO | Estimated f.CaO |
|---|---|---|---|---|---|---|
| Example 1 | 1.83 | 1160 | 1.00 | 1.89 | 0.18 | 0.30 |
| Example 2 | 0.43 | 1015 | 1.00 | 1.89 | 0.21 | 0.38 |
| Example 3 | 0.84 | 2455 | 1.00 | 2.31 | 0.26 | 0.50 |
| Example 4 | 2.64 | 2610 | 1.00 | 2.31 | 0.26 | 0.42 |
| Example 5 | 0.41 | 305 | 1.00 | 1.88 | 0.33 | 0.46 |
| Example 6 | 1.83 | 1150 | 0.93 | 1.90 | 0.36 | 0.64 |
| Example 7 | 2.11 | 340 | 1.00 | 1.89 | 0.38 | 0.35 |
| Example 8 | 2.00 | 5000 | 0.93 | 2.10 | 0.39 | 0.36 |
| Example 9 | 1.62 | 2535 | 1.00 | 2.31 | 0.39 | 0.46 |
| Example 10 | 3.05 | 2370 | 0.93 | 2.30 | 0.41 | 0.51 |
| Example 11 | 2.09 | 340 | 0.93 | 1.91 | 0.43 | 0.66 |
| Example 12 | 1.72 | 1450 | 1.00 | 2.30 | 0.46 | 0.58 |
| Example 13 | 2.62 | 1605 | 1.00 | 2.30 | 0.46 | 0.49 |
| Example 14 | 0.84 | 1625 | 1.00 | 2.30 | 0.49 | 0.63 |
| Example 15 | 2.01 | 2670 | 0.93 | 2.30 | 0.49 | 0.81 |
| Example 16 | 2.00 | 2440 | 0.93 | 2.10 | 0.50 | 0.61 |
| Example 17 | 0.50 | 5000 | 0.93 | 2.10 | 0.50 | 0.58 |
| Example 18 | 2.00 | 5000 | 0.90 | 2.10 | 0.55 | 0.50 |
| Example 19 | 2.00 | 1340 | 0.93 | 2.10 | 0.56 | 0.77 |
| Example 20 | 1.73 | 645 | 1.00 | 2.31 | 0.56 | 0.70 |
| Example 21 | 0.43 | 1020 | 0.93 | 1.90 | 0.56 | 1.41 |
| Example 22 | 2.00 | 2700 | 0.90 | 2.10 | 0.63 | 0.80 |
| Example 23 | 0.88 | 595 | 1.00 | 2.31 | 0.66 | 0.84 |
| Example 24 | 3.15 | 2740 | 0.90 | 2.31 | 0.71 | 0.50 |
| Example 25 | 2.72 | 695 | 1.00 | 2.30 | 0.74 | 0.56 |
| Example 26 | 1.12 | 2780 | 0.93 | 2.31 | 0.82 | 1.23 |
| Example 27 | 3.05 | 1580 | 0.93 | 2.31 | 0.84 | 0.57 |
| Example 28 | 0.50 | 5000 | 0.90 | 2.10 | 0.86 | 1.10 |
| Example 29 | 1.10 | 1595 | 0.93 | 2.31 | 0.87 | 1.71 |
| Example 30 | 2.07 | 1565 | 0.93 | 2.31 | 0.87 | 1.00 |
| Example 31 | 2.00 | 1390 | 0.90 | 2.10 | 1.14 | 1.06 |
| Example 32 | 2.12 | 2700 | 0.90 | 2.30 | 1.20 | 1.03 |
| Example 33 | 0.50 | 620 | 0.93 | 2.10 | 1.25 | 2.21 |
| Example 34 | 2.00 | 655 | 0.93 | 2.31 | 1.63 | 1.25 |
| Example 35 | 1.10 | 675 | 0.93 | 2.30 | 1.86 | 2.17 |
| Example 36 | 0.50 | 2310 | 0.90 | 2.10 | 1.95 | 2.49 |
| Example 37 | 1.15 | 2650 | 0.90 | 2.31 | 2.41 | 2.09 |
| Example 38 | 1.15 | 1635 | 0.90 | 2.31 | 3.39 | 2.71 |

TABLE 1-continued

|  | SO$_3$ | F | t | HM | f.CaO | Estimated f.CaO |
|---|---|---|---|---|---|---|
| Example 39 | 0.50 | 1195 | 0.90 | 2.10 | 3.52 | 3.50 |
| Example 40 | 1.16 | 670 | 0.90 | 2.30 | 4.44 | 3.45 |
| Example 41 | 0.50 | 640 | 0.90 | 2.10 | 4.89 | 4.15 |

Note:
SO$_3$ is an SO$_3$ amount (wt %) in the clinker;
F is a fluorine amount (mg/kg) in the clinker;
t is a coefficient determined based on a burning temperature (1.00 = 1450/1450, 0.93 = 1350/1450);
f.CaO is an actual measured value (wt %); and
Estimated f.CaO is a value calculated (wt %) based on Formula (1).

INDUSTRIAL APPLICABILITY

The present invention can be applied to a method for controlling the free lime content (f.CaO) of the clinker by adjusting the used amount of fuel or the additive amount of waste gypsum as an SO$_3$ source in the clinker, and adjusting the additive amount of fluorite or fluorine-containing waste that is a fluorine source in the clinker and used as a mineralizer using the Formula (1).

The invention claimed is:

1. A method for controlling a free lime content of a cement clinker, comprising:
adding fluorite or fluorine-containing waste that is a fluorine source in the cement clinker and used as a mineralizer to raw materials of the cement clinker,
intermixing a waste gypsum board powder with fuel or putting the waste gypsum board powder into a kiln from the kiln outlet part as an SO$_3$ source in the cement clinker,
burning the raw materials of the cement clinker added the fluorite or the fluorine-containing waste in the kiln to produce the cement clinker,
calculating the free lime content (f.CaO) of the cement clinker according to Formulas (1) to (3),
adjusting an additive amount of fluorite or fluorine-containing waste and an used amount of fuel or an additive amount of waste gypsum according to the calculated free lime content to control the free lime content (f.CaO) so as to fall within a range of 0.5<f.CaO<1.0, $$f.CaO = 0.29 \times e^{(0.65 \times A)} (A = a \times SO_3 + b) \quad (1)$$

$$a = 0.0001 \times F + 9.2 \times t - 0.18 \times HM - 9.2 \quad (2)$$

$$b = -0.0005 \times F - 32.8 \times t + 2.9 HM + 28.4 \quad (3)$$

in Formula (1), f.CaO is a free lime content (wt %),
SO$_3$ is an amount (wt %) of sulfur trioxide in the cement clinker,
a is a coefficient satisfying Formula (2),
b is a coefficient satisfying Formula (3),
F is an amount (mg/kg) of fluorine in the cement clinker,
t is a coefficient determined based on a temperature of 1450° C. (when a burning temperature is X° C., t=X/1450), and
HM is a hydraulic modulus.

2. The method for controlling a free lime content of a cement clinker according to claim 1,
wherein the amount of fluorine in the cement clinker is equal to or greater than 300 mg/kg.

* * * * *